(12) United States Patent
Cho et al.

(10) Patent No.: US 12,460,774 B2
(45) Date of Patent: Nov. 4, 2025

(54) FUEL STORAGE SYSTEM AND METHOD FOR DETECTING RESIDUAL QUANTITY OF FUEL

(71) Applicants: Hyundai Motor Company, Seoul (KR); Kia Corporation, Seoul (KR)

(72) Inventors: Young Jin Cho, Gimhae-Si (KR); Kyung Moon Lee, Uiwang-Si (KR); Ji Hoon Lee, Uiwang-Si (KR); Hoon Mo Park, Seongnam-Si (KR); Dong Hoon Nam, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 87 days.

(21) Appl. No.: 18/383,199

(22) Filed: Oct. 24, 2023

(65) Prior Publication Data

US 2024/0377031 A1 Nov. 14, 2024

(30) Foreign Application Priority Data

May 9, 2023 (KR) .................. 10-2023-0060086

(51) Int. Cl.
*F17C 5/06* (2006.01)
*F17C 5/00* (2006.01)

(52) U.S. Cl.
CPC ............ *F17C 5/06* (2013.01); *F17C 5/007* (2013.01); *F17C 2205/0338* (2013.01); *F17C 2221/012* (2013.01)

(58) Field of Classification Search
CPC ............ F17C 5/007; F17C 2221/012; F17C 2205/0338
See application file for complete search history.

(56) References Cited

U.S. PATENT DOCUMENTS

| | | | |
|---|---|---|---|
| 7,237,428 B2 | 7/2007 | DaCosta et al. | |
| 8,757,223 B2 * | 6/2014 | Uemura | F17C 5/06 141/4 |
| 9,324,200 B2 * | 4/2016 | Ito | G08B 21/182 |
| 9,347,612 B2 * | 5/2016 | Mathison | F17C 5/007 |
| 9,500,114 B2 * | 11/2016 | Shimazu | F01N 3/18 |
| 9,605,804 B2 * | 3/2017 | Mathison | F17C 5/007 |
| 10,030,816 B2 * | 7/2018 | Handa | F17C 13/025 |

(Continued)

FOREIGN PATENT DOCUMENTS

| | | |
|---|---|---|
| CN | 210556982 U | 5/2020 |
| JP | 2010-286015 A | 12/2010 |

(Continued)

*Primary Examiner* — Timothy L Maust
(74) *Attorney, Agent, or Firm* — Banner & Witcoff, Ltd.

(57) ABSTRACT

A fuel storage system and a method for detecting a remaining amount of fuel are provided. The fuel storage system may include a storage vessel which accommodates fuel including a solid material and gaseous hydrogen, one or more sensors that measure a first temperature in the storage vessel and a first internal pressure of the storage vessel, a controller that predicts a first remaining amount of the fuel based on the first temperature and the first internal pressure and based on a relationship among different values of temperature, different values of equilibrium pressure, and different values of remaining amounts of the fuel as measured by the one or more sensors at different times, and a display that displays the predicted first remaining amount of the fuel.

20 Claims, 9 Drawing Sheets

(56) References Cited

U.S. PATENT DOCUMENTS

| | | | |
|---|---|---|---|
| 11,946,599 B2* | 4/2024 | Cohen | F17C 5/06 |
| 2010/0307636 A1 | 12/2010 | Uemura | |
| 2012/0267002 A1 | 10/2012 | Kittilsen et al. | |
| 2013/0077653 A1* | 3/2013 | Koshimizu | G01K 7/22 |
| | | | 374/185 |
| 2017/0021726 A1* | 1/2017 | Kim | H01M 8/04201 |

FOREIGN PATENT DOCUMENTS

| | | |
|---|---|---|
| KR | 100931877 B1 | 12/2009 |
| KR | 102236150 B1 | 4/2021 |

* cited by examiner

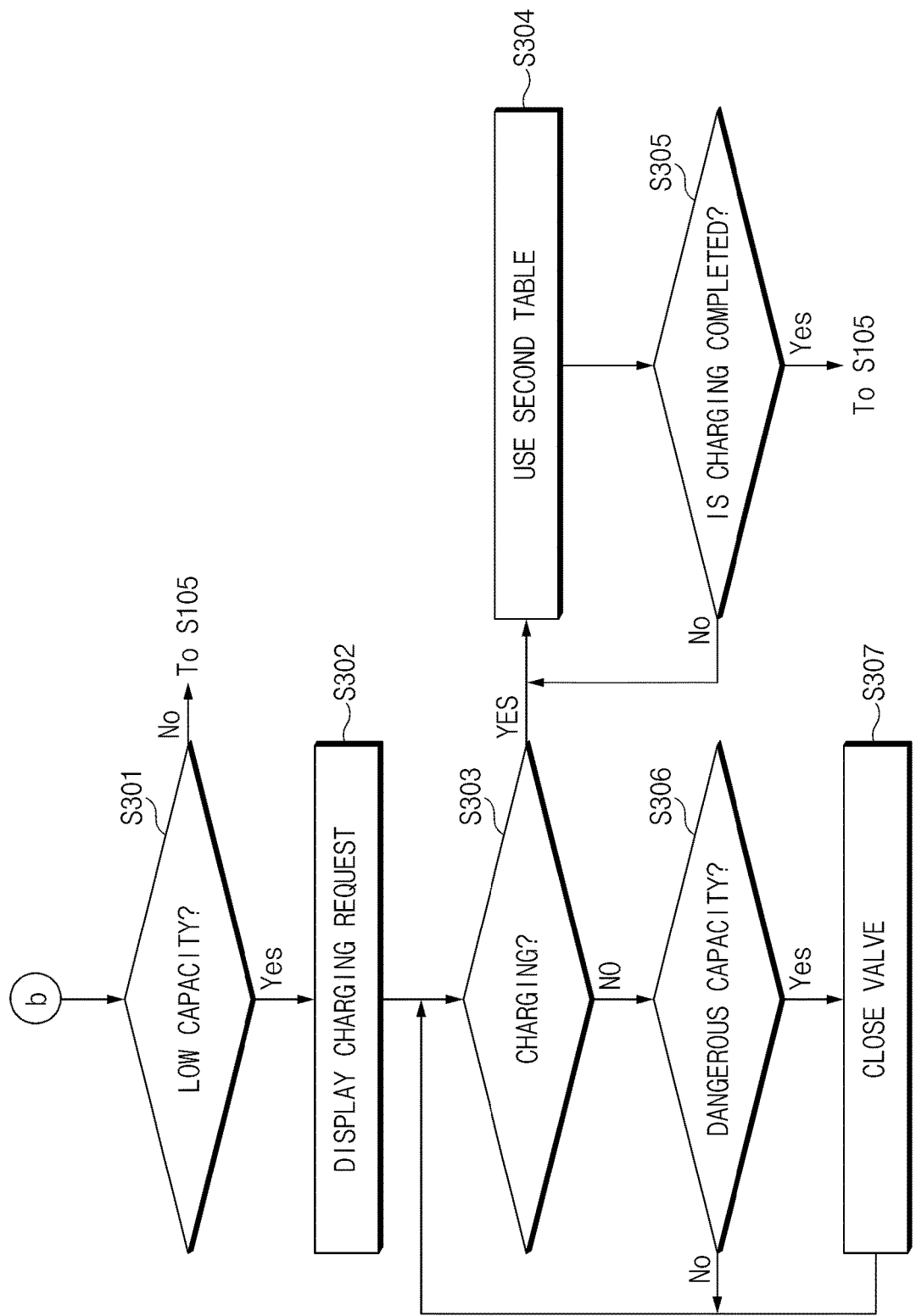

FUEL STORAGE SYSTEM AND METHOD FOR DETECTING RESIDUAL QUANTITY OF FUEL

CROSS-REFERENCE TO RELATED APPLICATION

This application claims the benefit of priority to Korean Patent Application No. 10-2023-0060086, filed in the Korean Intellectual Property Office on May 9, 2023, the entire contents of which are incorporated herein by reference.

TECHNICAL FIELD

The present disclosure relates to a fuel storage system and a method, and more specifically to detecting a remaining amount (e.g., residual quantity) of fuel.

BACKGROUND

Various methods of hydrogen storage include, for example, high-pressure gas storage, low-temperature liquefaction storage, and solid hydrogen storage. Solid hydrogen storage is a scheme by which hydrogen is physically stored in a porous solid material and chemically absorbed by means of bonds between a solid material and hydrogen atoms. Because it is possible to store hydrogen near normal atmospheric pressure with solid hydrogen storage, the solid hydrogen storage method may be more advantageous in terms of security and safety than the high-pressure gas storage method, and, in contrast to the low-temperature liquefaction storage method, there is little to no need of maintaining a very lower temperature in solid hydrogen storage.

A solid hydrogen storage system which stores hydrogen in such solid hydrogen storage may predict a remaining amount of hydrogen on the basis of a flow rate of hydrogen usage.

SUMMARY

The present disclosure has been made to solve the abovementioned problems occurring in the prior art while advantages achieved by the prior art are maintained intact.

An aspect of the present disclosure provides a fuel storage system for detecting a remaining amount of hydrogen based on pressure and temperature and a method for detecting a remaining amount of fuel.

Another aspect of the present disclosure provides a fuel storage system for detecting a remaining amount of hydrogen even when cutting off power and a method for detecting a remaining amount of fuel.

An aspect of the present disclosure provides a fuel storage system for detecting a remaining amount of hydrogen even without a separate flow meter and a method for detecting a remaining amount of fuel.

The technical problems to be solved by the present disclosure are not limited to the aforementioned problems, and any other technical problems not mentioned herein will be clearly understood from the following description by those skilled in the art to which the present disclosure pertains.

According to one or more example embodiments, a fuel storage system may include: a storage vessel configured to accommodate fuel, wherein the fuel comprises a solid material and gaseous hydrogen; one or more sensors configured to measure a first temperature in the storage vessel and a first internal pressure of the storage vessel; a controller configured to predict a first remaining amount of the fuel based on the first temperature and the first internal pressure and based on a relationship among different values of temperature, different values of equilibrium pressure, and different values of remaining amounts of the fuel as measured by the one or more sensors at different times; and a display configured to display the predicted first remaining amount of the fuel.

The one or more sensors may be disposed in piping connected in common with a plurality of storage vessels. The plurality of storage vessels may be connected in series or in parallel with each other.

The one or more sensors may include: a temperature sensor configured to measure a temperature of a coolant in the storage vessel; and a pressure sensor configured to measure a pressure of the gaseous hydrogen in the storage vessel.

The controller may be further configured to calculate an equilibrium pressure in relation to the first internal pressure, the first temperature, and the first remaining amount of the fuel. According to the relationship, a remaining amount of the fuel may have an inverse correlation with temperature under a same equilibrium pressure condition. According to the relationship, the remaining amount of the fuel may have a positive correlation with equilibrium pressure under a same temperature condition.

The controller may include: memory storing a plurality of tables that indicate the relationship; and a processor connected with the memory.

The plurality of tables may include: a first table to be applied when the fuel is being used; and a second table to be applied when the fuel is being charged.

The controller may be configured to: predict, based on a determination that the fuel is being used, the first remaining amount of the fuel based on the first table, and predict, based on a determination that the fuel is being charged, the first remaining amount of the fuel based on the second table.

The second table may indicate a second relationship in which a change in values of remaining amount of the fuel is affected by a change in values of equilibrium pressure to a lesser degree than the first table.

The controller may be configured to predict the first remaining amount of the fuel based on an average value of measurement values during a specified duration based on the first table and based on a measurement value of at least one of equilibrium pressure or temperature changing at a rate greater than or equal to a threshold.

The controller may be configured to predict the first remaining amount of the fuel, using the first table, based on a determination that an electronic device associated with the storage vessel has performed a cold start, and based on a measurement value of at least one of equilibrium pressure or temperature measured while the electronic device is stopped.

The display may be configured to display the predicted first remaining amount of the fuel by displaying a screen representing the predicted first remaining amount of the fuel using lighting of a light emitting element.

The display may be configured to display the predicted first remaining amount of the fuel by displaying a fuel gauge screen pointing to the predicted first remaining amount of the fuel using a pointer.

The fuel storage system may further include: a water gauge connected with the one or more sensors. The water gauge may include a float disposed in liquid in a water level pipe or at a side of the water level pipe. At least one of the pressure sensor or the temperature sensor may be connected with at least one of the liquid or the float.

The float may be configured to indicate the first temperature measured by the temperature sensor and the first internal pressure measured by the pressure sensor. The display may be configured to display the predicted first remaining amount of the fuel by displaying the first remaining amount of the fuel based on the first temperature and the first internal pressure indicated on the float.

The float may be configured to, based on the storage vessel being disposed under a first environmental condition, indicate, using a point on a graph to which a function of a first slope is applied, the first temperature measured by the temperature sensor. The float may be configured to, based on the storage vessel being disposed under a second environmental condition, indicate, using a point on a graph to which a function of a second slope different from the first slope is applied, the first temperature measured by the temperature sensor. The first environmental condition and the second environmental condition may differ from each other in at least one of temperature, altitude, or ground gradient.

According to one or more example embodiments, a method may include: measuring a first temperature in a storage vessel accommodating fuel, the fuel including a solid material and gaseous hydrogen, and a first internal pressure of the storage vessel; predicting a first remaining amount of the fuel based on the first temperature and the first internal pressure and based on a relationship among different values of temperature, different values of equilibrium pressure, and different values of remaining amounts of the fuel measured at different times; and displaying the predicted first remaining amount of the fuel.

Measuring may include: measuring the first temperature in the storage vessel and the first internal pressure of the storage vessel using a sensor disposed in piping connected in common with a plurality of storage vessels, wherein the plurality of storage vessels are connected in series or in parallel with each other.

Predicting the first remaining amount of the fuel may include one of: predicting the first remaining amount of the fuel based on a first table that indicates a first relationship, while the fuel is being used, among different values of equilibrium pressure, different values of temperature, and different values of remaining amounts of the fuel; or, based on a determination that the fuel is being charged, predicting the first remaining amount of the fuel based on a second table that indicates a second relationship, while the fuel is being charged, among different values of equilibrium pressure, different values of temperature, and different values of remaining amount of the fuel. In the second relationship, a change in values of remaining amount of the fuel may be affected by a change in values of equilibrium pressure to a lesser degree than in the first relationship.

The method may further include one of: predicting the first remaining amount of the fuel according to an average value of measurement values during a specified duration based on the first table and based on a measurement value of at least one of equilibrium pressure or temperature changing at a first rate greater than or equal to a threshold; or predicting the first remaining amount of the fuel, using the first table, based on a determination that an electronic device associated with the storage vessel has performed a cold start, and based on a measurement value of at least one of equilibrium pressure or temperature measured while the electronic device is stopped.

The method may further include: indicating, using a float of a water gauge, the first temperature and the first internal pressure.

BRIEF DESCRIPTION OF THE DRAWINGS

The above and other objects, features and advantages of the present disclosure will be more apparent from the following detailed description taken in conjunction with the accompanying drawings:

FIGS. 6A, 6B, and 6C are flowcharts illustrating a method for detecting a remaining amount of fuel in a fuel storage system.

DETAILED DESCRIPTION

Figure 1:
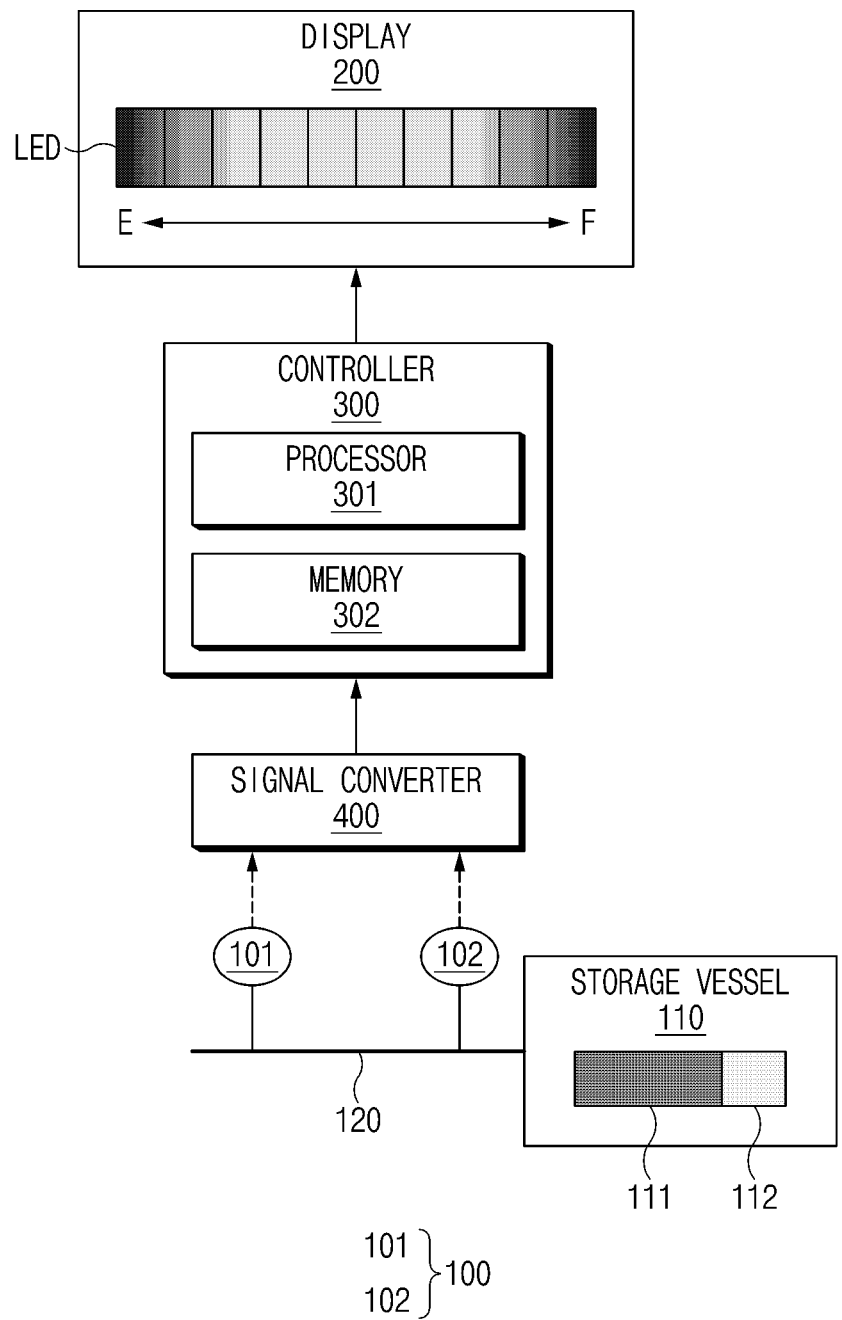
FIG. 1 is a block diagram illustrating a fuel storage system.

Hereinafter, one or more example embodiments of the present disclosure will be described in detail with reference to the accompanying drawings. In adding the reference numerals to the components of each drawing, it should be noted that the identical component is designated by the identical numerals even when they are displayed on other drawings. Further, in describing the example embodiments of the present disclosure, a detailed description of well-known features or functions will be ruled out in order not to unnecessarily obscure the gist of the present disclosure.

In describing the components of the example embodiments according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, one or more example embodiments of the present disclosure will be described in detail with reference to FIGS. 1 to 7.

Figure 2:
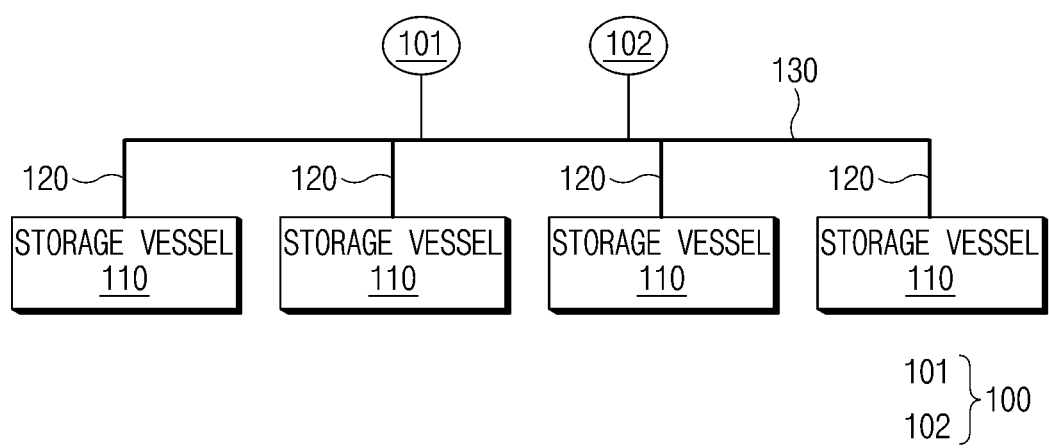
FIG. 2 is a drawing illustrating a connection relationship between a plurality of storage vessels arranged in parallel with a sensor module shown in FIG. 1.

FIG. 1 is a block diagram illustrating a fuel storage system. FIG. 2 is a drawing illustrating a connection relationship between a plurality of storage vessels arranged in parallel with a sensor module shown in FIG. 1.

Referring to FIG. 1, the fuel storage system may include at least one sensor module 100 (e.g., one or more sensors), a signal converter 400, a controller 300, and a display 200. The fuel storage system of FIG. 1 may be a solid hydrogen storage system, which may be mounted on a vehicle, may be mounted on a filling tank lorry, or may be installed in a filling station.

The sensor module 100 may be installed in supply piping 120 connected with at least one of an inlet or an outlet of a storage vessel 110. When the storage vessel 110 receives hydrogen gas through the supply piping 120, filling of hydrogen in the storage vessel 110 may be performed.

The storage vessel 110 may include a first area 111 and a second area 112. The first area 111 and the second area 112 may be disposed to communicate with each other. A hydrogen storage alloy in the form of a solid may be accommodated in the first area 111. The hydrogen storage alloy may be a solid material capable of reversibly adsorbing (or absorbing) and desorbing a large amount of hydrogen. When hydrogen in the form of gas supplied through the supply piping 120 is absorbed (or adsorbed) in the hydrogen storage alloy at a low temperature, a reversible metal hydride may be formed. As hydrogen is chemically stored on the hydrogen storage alloy in a solid state by an absorption process, the metal hydride may be formed.

To immediately use hydrogen, a certain amount of pressure of which is ensured, hydrogen in the form of gas (or hydrogen gas) may be accommodated in the second area 112. The second area 112 may occupy 5% to 10% of the entire capacity of the storage vessel 110. The second area 112 in which hydrogen in the form of gas is stored may be an area which serves as a buffer in the storage vessel 110. When hydrogen in the form of gas is filled in a vehicle, it may be supplied from the outside through the supply piping 120.

The sensing module 100 may include at least one temperature sensor 101 and at least one pressure sensor 102. The pressure sensor 102 may detect pressure in the storage vessel 110, which changes as hydrogen gas is injected into the storage vessel 110 or is emitted from the storage vessel 110, (or pressure of the second area 112 of the storage vessel 110 in which the hydrogen gas is stored) (or pressure of the hydrogen gas). The temperature sensor 101 may detect a temperature in the storage vessel 110, which changes as hydrogen gas is injected into the storage vessel 110 or is emitted from the storage vessel 110, (or an internal temperature of the second area 112) (or a temperature of a coolant which circulates in the storage vessel 110).

The sensor module 100 may be installed per supply piping 120 of the storage vessel 110 as shown in FIG. 1 or may be installed in common piping 130 which connects the plurality of pieces of piping 120 of the plurality of storage vessels 110 as shown in FIG. 2. As an example, the sensor module 100 may be installed in the common piping 130 which connect the plurality of pieces of supply piping 120 of the plurality of storage vessel 110, which are connected in series or parallel with each other, in common. A total remaining amount (e.g., residual quantity) and an amount of charging flow of the plurality of storage vessels 110 may be measured based on the pressure and the temperature measured by means of the sensor module 100 installed in the common piping 130.

The signal converter 400 may convert a physical quantity detected from the sensor module 100 into an electrical signal and may transmit the electrical signal to the controller 300. The signal converter 400 may convert a physical quantity of the temperature detected from the temperature sensor 101 into temperature information which is an electrical signal, may convert a physical quantity of pressure detected from the pressure sensor 102 into pressure information which is an electrical signal, and may transmit the temperature information and the pressure information to the controller 300.

When a change in pressure in the storage vessel 110, which is measured by means of the pressure sensor 102, becomes stable or constant (or when a change in pressure does not occur), the controller 300 may recognize that the storage vessel 110 reaches an equilibrium state. The controller 300 may obtain internal pressure of the storage vessel 110 in the equilibrium state as equilibrium pressure. The controller 300 may estimate a remaining amount (e.g., residual quantity) of fuel (or a remaining amount of hydrogen) in the storage vessel 110 based on the equilibrium pressure and the temperature obtained by means of the temperature sensor 101.

Such a controller 300 may include a processor 301 and a memory 302. The processor 301 may control the overall operation of the controller 300. The processor 301 may be electrically connected with the memory 302, the display 200, the signal converter 400, or the like and may electrically control the respective components. The processor 301 may be an electrical circuit which executes instructions of software and may perform a variety of data processing and calculation described below. The processor 301 may be implemented as at least one of an application specific integrated circuit (ASIC), a digital signal processor (DSP), programmable logic devices (PLD), field programmable gate arrays (FPGAs), a central processing unit (CPU), microcontrollers, or microprocessors. The memory 302 may be a non-transitory storage medium which stores instructions executed by the processor 301. The memory 302 may be implemented as at least one of storage media (or recording media) such as a flash memory, a hard disk, a random access memory (RAM), a static RAM (SRAM), a read only memory (ROM), a programmable ROM (PROM), an electrically erasable and programmable ROM (EEPROM), an erasable and programmable ROM (EPROM), or a register.

The memory 302 may store a plurality of tables in which a remaining amount (e.g., residual quantity) of fuel according to an equilibrium pressure-temperature is defined. The memory 302 may store a plurality of tables in which a remaining amount of fuel according to an equilibrium pressure-temperature is defined to be suitable for a fuel driving condition (or a driving condition of the vehicle). For example, the memory 302 may store a first table and a second table. In the first table, a remaining amount of fuel according to an equilibrium pressure-temperature may be defined suitably when fuel is used (or the vehicle normally drives). In the second table, a remaining amount of fuel according to an equilibrium pressure-temperature may be defined suitably when fuel is charged (or the vehicle is charged). In each of the first table and the second table, a relationship among at least two pieces of reference equilibrium pressure information among a plurality of pieces of equilibrium pressure information, at least two pieces of reference temperature information among a plurality of pieces of temperature information, and a reference remaining amount of fuel among a plurality of remaining amounts of fuel may be defined.

The remaining amount (e.g., residual quantity) of fuel may be inversely proportional to temperature and may be proportional to equilibrium pressure as shown in FIG. 1. The remaining amount of fuel may be calculated from the relationship between temperature and equilibrium pressure. In the same temperature, the higher the equilibrium pressure, the more the remaining amount of fuel may increase. In other words, the remaining amount of fuel may have a positive correlation with the equilibrium pressure under the same temperature condition. In the same equilibrium pressure, the lower the temperature, the more the remaining amount of fuel may increase. In other words, the remaining amount of fuel may have an inverse correlation with temperature under the same equilibrium pressure condition.

$$\text{Remaining amount of fuel} \propto \frac{\text{Equilibrium pressure}}{\text{Temperature}} \quad \text{[Equation 1]}$$

The processor 301 may be configured to predict a remaining amount based on any one of the first table or the second table stored in the memory 302 and may output a level gauge corresponding to the predicted remaining amount on the display may receive additional pressure 200. The processor 301 information and additional temperature information other than reference pressure information and reference temperature information respectively stored in the first table and the second table. In this case, the remaining amount of fuel for the additional pressure information and the additional temperature information may be calculated to be proportional to an adjacent remaining amount of fuel. For example, the remaining amount of fuel for the additional pressure information and the additional temperature information may be calculated in linear interpolation.

The processor 301 may be configured to predict a remaining amount (e.g., residual quantity) based on the first table when fuel in which the remaining amount of fuel decreases in real time is being used (e.g., discharged, consumed) and output the predicted remaining amount on the display 200. The processor 301 may be configured to predict a remaining amount based on the second table when fuel in which the remaining amount of fuel increases for a short time is being charged and output the predicted remaining amount on the display 200. Because a more rapid change in pressure for a short time occurs when fuel is being charged than when fuel is being discharged, the processor 301 may predict a remaining amount of fuel based on the second table that is more insensitive to a change in pressure. In other words, the second table may indicate a relationship in which the change in remaining amount of fuel is affected by the change in hydrogen pressure (e.g., equilibrium pressure) to a lesser degree than a similar relationship indicated by the first table. For example, the second table may be defined such that a remaining amount of fuel is calculated based on a slow charging time set to be longer than a normal (or fast) charging time from a fuel complete discharging state to a full fuel charging state.

The processor 301 may detect that an electronic device (e.g., a vehicle) loaded with the storage vessel 110 performs a cold start. The processor 301 may predict a remaining amount of fuel according to a temperature and equilibrium pressure when stopping motoring (or a start) of a drive motor which starts the electronic device, based on the first table. The processor 301 may be configured to output the predicted remaining amount on the display 200.

After stopping the start of the electronic device (e.g., the vehicle) load with the storage vessel 110, the processor 301 may detect that the electronic device performs restarting using a cold start. The processor 301 may be configured to predict a remaining amount of fuel according to a temperature and equilibrium pressure when the start of the electronic device is stopped based on the first table and output the predicted remaining amount of fuel on the display 200.

The processor 301 may be configured to, when a rapid change in temperature is detected, calculate an average value of remaining amounts of fuel during a specified time (e.g., several minutes) based on the first table and output the calculated average value as the remaining amount (e.g., residual quantity) of fuel on the display 200.

The processor 301 may be configured to, when the sharp change in temperature is detected, calculate an average value of measurement values of at least one of a temperature or equilibrium pressure during a first specified time (e.g., several minutes) and output a remaining amount of fuel of the first table according to the calculated average value on the display 200 during a second specified time (e.g., several minutes).

The processor 301 may detect a rapid change in temperature when the electronic device (e.g., the vehicle) loaded with the storage vessel 110 performs a cold start or when there is a change in environment of the storage vessel 110 (e.g., movement of the storage vessel 110 from a room temperature area to a refrigeration area). The processor 301 may minimize occurrence of an error by predicting the remaining amount of fuel using the average value when the temperature is rapidly changed.

The processor 301 may be configured to, when the remaining amount of fuel is detected as low capacity, output an image corresponding to a charging request signal on the display 200. The processor 301 may be configured, when the remaining amount of fuel is detected as dangerous capacity, close at least one valve (not shown) connected with the storage vessel 110.

The processor 301 may determine over-pressure or an abnormal temperature of the storage vessel 110 using the temperature and the pressure obtained by means of the sensor module 100. The processor 301 may control a valve upon the over-pressure of the storage vessel 110 and may control a temperature of a coolant upon the abnormal temperature of the storage vessel 110.

The controller 300 may include at least one of a short-range communication module, a wired communication module, and a wireless communication module. The wired communication module may include various cable communication modules, such as a universal serial bus (USB), a high definition multimedia interface (HDMI), a digital visual interface (DVI), recommended standard 232 (RS-232), power line communication, or a plain old telephone service (POTS), as well as various wired communication modules, such as a controller area network (CAN) communication module, a local area network (LAN) module, a wide area network (WAN) module, or a value added network (VAN) module. The wireless communication module may include a wireless communication module which supports various wireless communication schemes such as global system for mobile communication (GSM), code division multiple access (CDMA), wideband CDMA (WCDMA), universal mobile telecommunication system (UMTS), time division multiple access (TDMA), or long term evolution (LTE), other than a wireless-fidelity (Wi-Fi) module and a wireless broadband (WiBro) module.

The controller 300 may transmit the predicted remaining amount of fuel to a server, which manages a gauge panel of the vehicle load with the fuel storage system or the fuel storage system through the communication module.

The display 200 may be controlled by the processor 301 to display a screen capable of monitoring a remaining amount of fuel. The display 200 may be a display of the electronic device loaded with the storage vessel 110.

The display 200 may be implemented as a head-up display (HUD), a cluster, audio video navigation (AVN), or the like. Furthermore, the display 200 may include at least one of a liquid crystal display (LCD), an organic LED (OLED) display, a flexible display, a bended display, or a three-dimensional (3D) display. Some thereof may be implemented as transparent displays configured as a transparent type or a semi-transparent type to see the outside. Moreover, the display 200 may be provided as a touchscreen including a touch panel to be used as an input device other than an output device.

The display 200 may display the remaining amount (e.g., residual quantity) of fuel predicted by the controller 300. The display 200 may digitalize the remaining amount of fuel in a digital form or may perform level gauging of the remaining amount of fuel in a digital form to visualize the remaining amount of fuel. The display 200 may display a fuel gauge screen pointing to the remaining amount of fuel using a pointer. The display 200 may display a screen indicating the remaining amount of fuel using lighting of an LED.

A red LED included in the display 200 may be turned on when over-pressure and high temperature occur. When the remaining amount of fuel is within a predetermined stable range, a yellow LED included in the display 200 may be turned on. A user of the vehicle may monitor the display 200 in real time to inspect a remaining amount of fuel and a vehicle state in real time.

Figure 3:
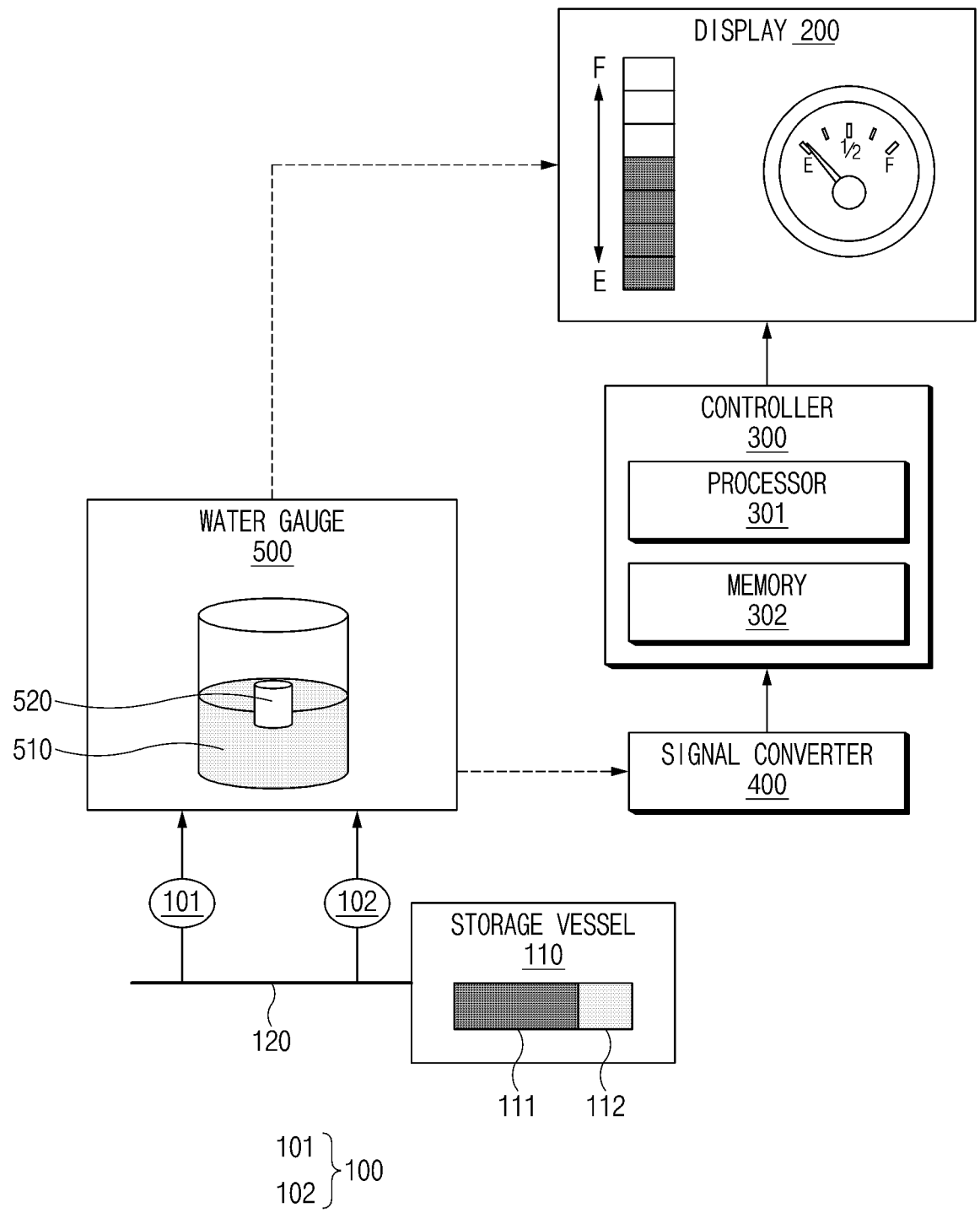
FIG. 3 is a block diagram illustrating a fuel storage system.

FIG. 3 is a block diagram illustrating a fuel storage system.

Referring to FIG. 3, the fuel storage system may include at least one sensor module 100, a signal converter 400, a controller 300, a water gauge 500, and a display 200. The fuel storage system shown in FIG. 3 may have the same configuration as the fuel storage system shown in FIG. 1 except for further having the water gauge 500. Thus, the same configuration, operation, or the like may apply the above description.

The water gauge 500 may include liquid 510 and a float 520. At least one of the liquid 510 or the float 520 may be connected with at least one of a pressure sensor 102 or a temperature sensor 101.

The liquid 510 in a water level pipe may be connected with the pressure sensor 102. The liquid 510 in the water level pipe may vary in water level in proportion to the pressure measured by means of the pressure sensor 102.

The float 520 may be disposed in the liquid 510 or at a side of the water level pipe to increase visibility of a water level of the liquid 510. The water gauge 500 may gauge a level of pressure by means of a first portion of the float 520.

The float 520 may be connected with the temperature sensor 101. The temperature measured by means of the temperature sensor 101 may be differently visualized according to an environment in which a storage vessel 110 is installed on a second portion of the float 520.

When the storage vessel 110 is located in a first environmental condition, the temperature measured by means of the temperature sensor 101 may be visualized using points of a graph to which a function of a first slope (e.g., a slope of 1) is applied on the second portion of the float 520. When the storage vessel 110 is located in a second environmental condition, the temperature measured by means of the temperature sensor 101 may be visualized using points of a graph to which a function of a second slope (e.g., a slope of 0.9 or 1.1) is applied on the second portion of the float 520. The first environmental condition and the second environmental condition may differ in at least one of temperature, altitude, or gradient of the ground from each other.

As an example, when the storage vessel 110 is located in the first environmental condition at a low temperature (e.g., at a temperature of the cold start), the temperature measured by means of the temperature sensor 101 may be visualized using points of a graph to which the function of the first slope (e.g., the slope of 1) is applied on the second portion of the float 520. When the storage vessel 110 is located in the second environmental condition at a high temperature, the temperature measured by means of the temperature sensor 101 may be visualized using points of a graph to which the function of the second slope (e.g., the slope of 0.9 or 1.1) is applied on the second portion of the float 520.

As another example, when the storage vessel 110 is located in the first environmental condition at a high altitude, the temperature measured by means of the temperature sensor 101 may be visualized using points of a graph to which the function of the first slope (e.g., the slope of 1) is applied on the second portion of the float 520. When the storage vessel 110 is located in the second environmental condition at a low altitude, the temperature measured by means of the temperature sensor 101 may be visualized using points of a graph to which the function of the second slope (e.g., the slope of 0.9 or 1.1) is applied on the second portion of the float 520.

As another example, when the storage vessel 110 is located in the first environmental condition at a first gradient (e.g., a gradient of 0), the temperature measured by means of the temperature sensor 101 may be visualized using points of a graph to which the function of the first slope (e.g., the slope of 1) is applied on the second portion of the float 520. When the storage vessel 110 is located in the second environmental condition at a second gradient different from the first gradient, the temperature measured by means of the temperature sensor 101 may be visualized using points of a graph to which the function of the second slope (e.g., the slope of 0.9 or 1.1) is applied on the second portion of the float 520.

The signal converter 400 may obtain the pressure and the temperature visualized by means of the water gauge 500 and may convert the obtained pressure and temperature into an electrical signal.

A remaining amount (e.g., residual quantity) of fuel according to the pressure and the temperature visualized by means of the water gauge 500 may be directly displayed on the display 200. The remaining amount of fuel may be directly displayed on the display 200 by means of a pointer interworking with the water gauge 500.

Figure 4:
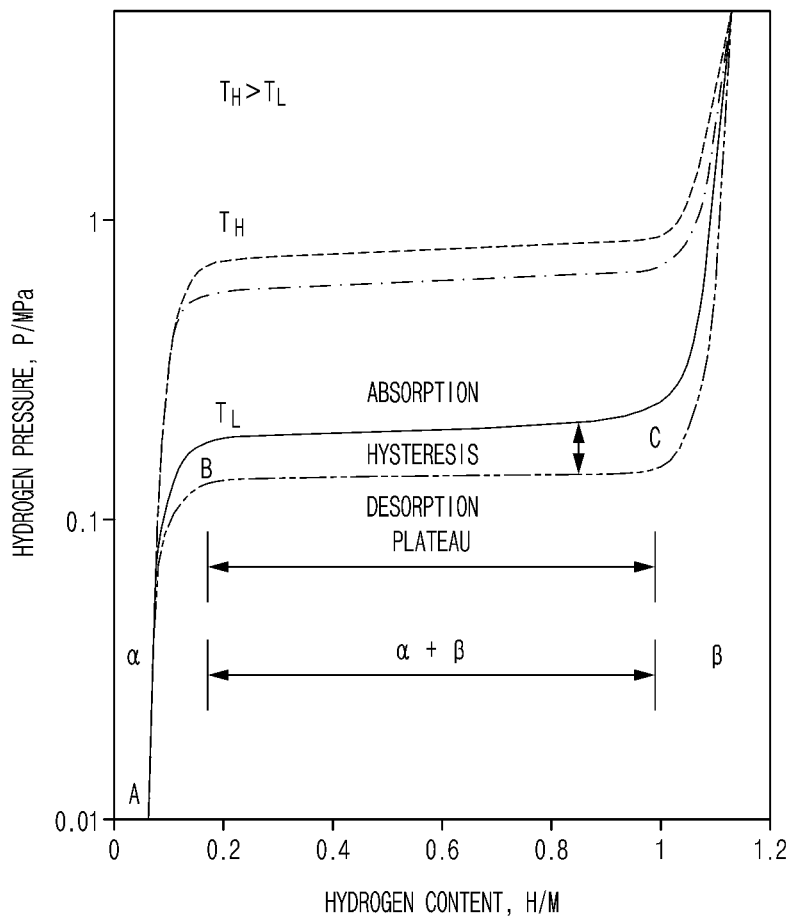
FIG. 4 is a drawing illustrating a pressure-composition temperature (PCT) curve measured using a hydrogen storage alloy stored in a storage vessel.

FIG. 4 is a drawing illustrating a pressure-composition temperature (PCT) curve measured using a hydrogen storage alloy stored in a storage vessel. In FIG. 4, the vertical axis may indicate equilibrium pressure at a specified temperature (e.g., $T_L$) of hydrogen gas, and the horizontal axis may indicate a ratio H/M of a hydrogen atom H in a sold phase to a metal atom M, which indicates an equilibrium state.

Referring to FIG. 4, when hydrogen pressure of hydrogen gas rapidly increases in a state of a certain temperature $T_L$, hydrogen adsorbed on the surface of a hydrogen storage alloy may be dissociated and dissolved in the hydrogen storage alloy to generate a solid solution (a state where hydrogen is adsorbed in the hydrogen storage alloy). At this time, an H/M content may increase from point A to point B. A hydrogen storage alloy phase in which hydrogen in an A-B interval is adsorbed may be referred to as an α-phase.

When it reaches point B, as there is almost no change in hydrogen pressure and hydrogen diffused in the α-phase and the hydrogen storage alloy reacts with each other, the α-phase changes to a β-phase which is a metal hydride. There may be a content range in which the α-phase and the β-phase coexist together (an α+β phase), and equilibrium pressure may almost become constant in a certain temperature condition within the range. As such, a B-C interval which is a horizontal portion of an isotherm may be defined as a plateau interval. The width of the plateau interval is used to determine an amount (or a storage amount or a remaining amount) of hydrogen stored in a storage vessel. Pressure indicated by the plateau interval may be referred to as equilibrium pressure.

When most α-phases are β-phases, point B may become C point. When hydrogen pressure increases again after point C, the content of the β-phase may approach a stoichiometric composition. The hydrogen absorption and desorption process may be reversible, and hysteresis which is a difference between equilibrium hydrogen pressure of absorption and equilibrium hydrogen pressure of desorption may be represented.

The higher the temperature (e.g., the higher the temperature from $T_L$ to $T_H$), the more the equilibrium pressure in the plateau interval may increase.

Because the amount of hydrogen varies with equilibrium pressure and a temperature in the plateau interval where the internal pressure of the storage vessel 110 is kept constant, an absorption amount of hydrogen may be predicted based on the equilibrium pressure and the temperature in the plateau interval.

Figure 5:
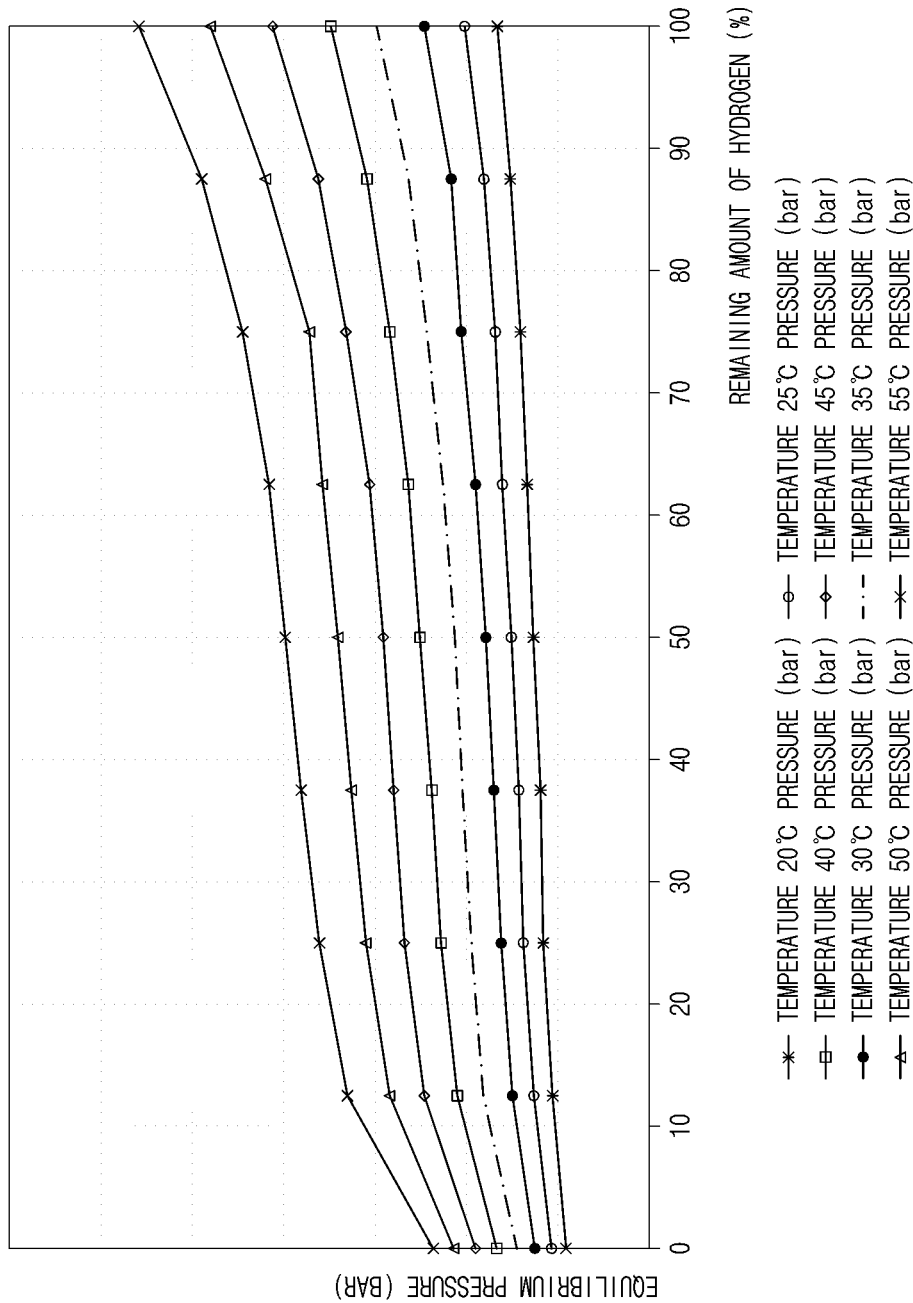
FIG. 5 is a graph illustrating a remaining amount of fuel according to equilibrium pressure for each temperature.

FIG. 5 is a graph illustrating a remaining amount of fuel according to equilibrium pressure for each temperature. Numerical values of a temperature and a remaining amount of fuel shown in FIG. 5 are described to help the understanding of the present disclosure, which are not limited to contents of the present disclosure.

Referring to FIG. 5, a controller 300 may change a remaining amount (e.g., residual quantity) of hydrogen in a storage vessel 110 (or a hydrogen capacity included in a hydride) (or a remaining amount of fuel), depending on pressure of hydrogen gas in the storage vessel 110 or an internal temperature of the storage vessel 110 (or a temperature of a coolant).

As hydrogen gas is continuously charged (or discharged) in the storage vessel 110 through supply piping 120, internal pressure in the storage vessel 110 may rise (or falls). Internal pressure when a change in pressure in the storage vessel 110, which is measured by means of a pressure sensor 102, becomes constant (or when a change in pressure does not occur) may be obtained as equilibrium pressure. The equilibrium pressure may have a unique value depending on a remaining amount of hydrogen, internal pressure, and a temperature in a second area 112 of the storage vessel 110 in which hydrogen gas is accommodated. As shown in an equilibrium pressure curve illustrated in FIG. 5, as a temperature falls in certain equilibrium pressure, a remaining amount of hydrogen may increase. As the equilibrium pressure rises at a certain temperature, the remaining amount of hydrogen may increase. In a certain remaining amount of hydrogen, as the temperature rises, equilibrium pressure in the storage vessel 110 may be high. The present disclosure may gauge a remaining amount of hydrogen according to the equilibrium pressure and the temperature for each level using the equilibrium pressure curve shown in FIG. 5.

Figure 6A:
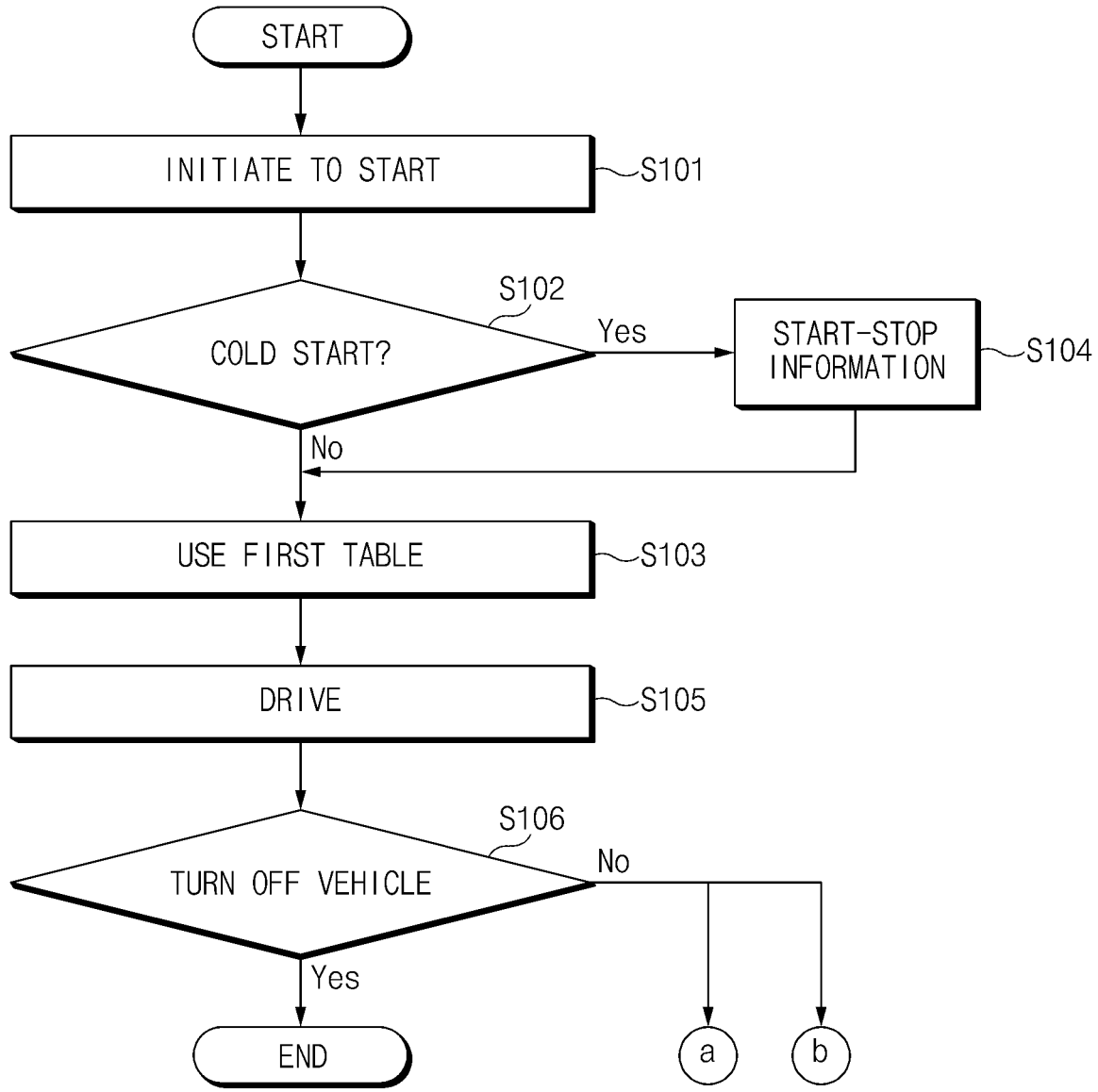
Figure 6B:
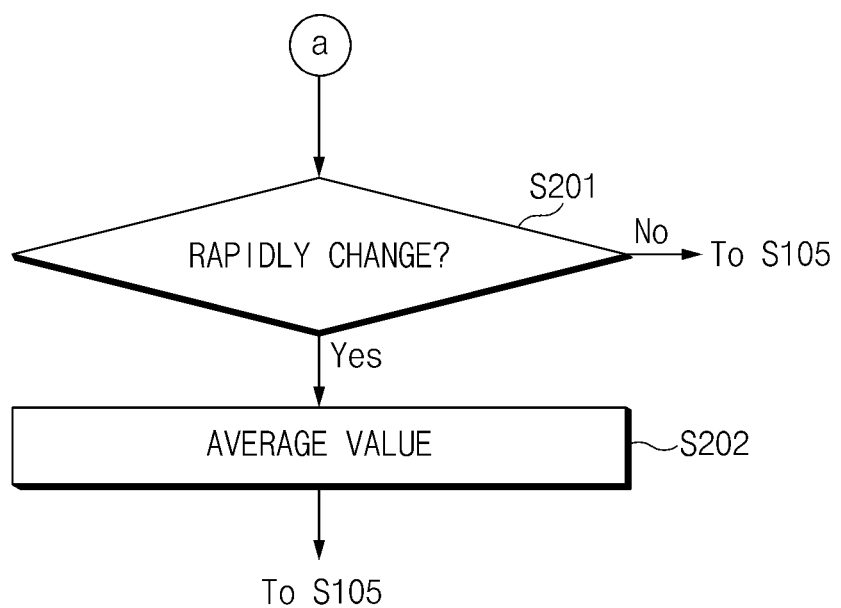

FIGS. 6A to 6C are flowcharts illustrating a method for detecting a remaining amount of fuel in a fuel storage system. The case where a fuel storage system is installed in a vehicle will be described as an example with reference to FIGS. 6A to 6C.

Referring to FIGS. 6A to 6C, in S101, a controller 300 may initiate a start sequence of the vehicle depending on a request from a vehicle user. The vehicle user may press a start button in a state where he or she presses the brake pedal to request to initiate the start sequence or may turn a start key and may set a power supply state of the vehicle to an ON state to request to initiate the start sequence.

In S102, the controller 300 may determine whether a vehicle engine performs a cold start.

When it is determined that the vehicle engine is not in the cold start state (No in S102), in S103, the controller 300 may display a remaining amount (e.g., residual quantity) of fuel according to pressure and a temperature measured by means of a sensor module 100 when starting the vehicle on a display 200 of the vehicle based on a first table.

When it is determined that the vehicle engine is in the cold start state (Yes in S102), in S104, the controller 300 may obtain start-stop information including pressure and a temperature measured when stopping starting the vehicle. The controller 300 may a remaining amount of fuel according to the obtained pressure when stopping starting the vehicle and the obtained temperature when stopping starting the vehicle during a specified time (e.g., several minutes) on the display 200 of the vehicle, based on the first table. After the specified time, in S103, the controller 300 may display a remaining amount of fuel according to the pressure and the temperature measured in real time on the display 200 of the vehicle, based on the first table.

In S105, the controller 300 may initiate to drive the vehicle depending on the request from the vehicle user. At this time, the controller 300 may obtain pressure and a temperature in real time, while the vehicle is traveling, and may update a remaining amount of fuel according to the obtained pressure and temperature on the display 200 of the vehicle, based on the first table.

In S106, the controller 300 may determine whether the driving of the vehicle is maintained. When the driving of the vehicle is ended, the controller 300 may control the vehicle to stop the engine and turn off the vehicle.

While the driving of the vehicle is maintained as the driving of the vehicle is not ended, in S201, the controller 300 may determine whether a measurement value of at least one of the temperature or the pressure measured by means of the sensor module 100 rapidly changes. The controller 300 may determine whether the measurement value changes at a rate greater than or equal to a threshold (e.g., 5%). When the vehicle moves from a room-temperature area to a low-temperature area (e.g., a freezer) or upon a cold start, the temperature measured by means of the sensor module 100 may rapidly change. For example, in an environment of −20 degrees, a temperature of a coolant to a rated temperature upon a cold start of the vehicle may rapidly change to 60 degrees to 70 degrees.

When it is determined that the measurement value does not rapidly change, in S105, the controller 300 may update a remaining amount of fuel according to the measurement value on the display 200 of the vehicle based on the first table.

When it is determined that the measurement value rapidly changes, in S202, the controller 300 may display a remaining amount of fuel according to an average value of measurement values during a specified time (e.g., several minutes) before the measurement value rapidly changes on the display 200 of the vehicle, based on the first table. Thus, because sensitivity of the rapid change in temperature is lowered, an error in the measurement value and an error in the remaining amount of fuel due to the rapid change in temperature may be reduced.

While the vehicle is traveling, In S301, the controller 300 may determine whether the remaining amount of fuel is a low capacity. For example, when the remaining amount of fuel is predicted as being less than or equal to 10%, the controller 300 may determine the remaining amount of fuel as the low capacity.

When it is determined that the remaining amount of fuel is the low capacity, in S302, the controller 300 may display a charging request signal on the display 200 of the vehicle. For example, the charging request signal may be displayed on the display 200 of the vehicle such that a pointer of a fuel gauge points to being "low".

In S303, the controller 300 may determine whether the vehicle is charged. For example, the controller 300 may determine whether the vehicle is charged based on whether a filling nozzle of a filling station and a receptacle of the vehicle are connected with each other.

When the vehicle is charged (Yes in S303), in S304, the controller 300 may control a pressure reducing valve (not shown) connected with the storage vessel 110 to prevent over-pressure filling, such that hydrogen gas is filled at certain pressure in the storage vessel 110. In S103, when the vehicle is charged, the controller 300 may display a remaining amount of fuel on the display 200 of the vehicle based on a second table. Because a change in pressure is rapidly performed when the vehicle into which high-pressure hydrogen gas is injected is charged, the remaining amount of fuel may be displayed on the display 200 of the vehicle based on the second table which is more insensitive to the change in pressure than the first table. Thus, because sensitivity of the rapid change in pressure in lowered, an error in the remaining amount of fuel due to the rapid change in pressure may be reduced. Upon over-pressure filling, a notification or a monitoring situation for preventing risk may be displayed on the display 200 of the vehicle.

In S305, the controller 300 may determine whether the vehicle is charged. When the vehicle starts to drive after the charging of the vehicle is completed, in S105, the controller 300 may predict a remaining amount of fuel based on the first table and may update the predicted remaining amount of fuel on the display 200 of the vehicle.

When the vehicle is not charged (No in S303), in S306, the controller 300 may determine whether the remaining amount of fuel is a dangerous capacity. For example, when the remaining amount of fuel is predicted as being less than or equal to 5%, the controller 300 may determine the remaining amount of fuel as the dangerous capacity.

When the remaining amount of fuel is determined as the dangerous capacity, in S307, the controller 300 may close at least one valve (not shown) connected with the storage vessel 110.

Figure 7:
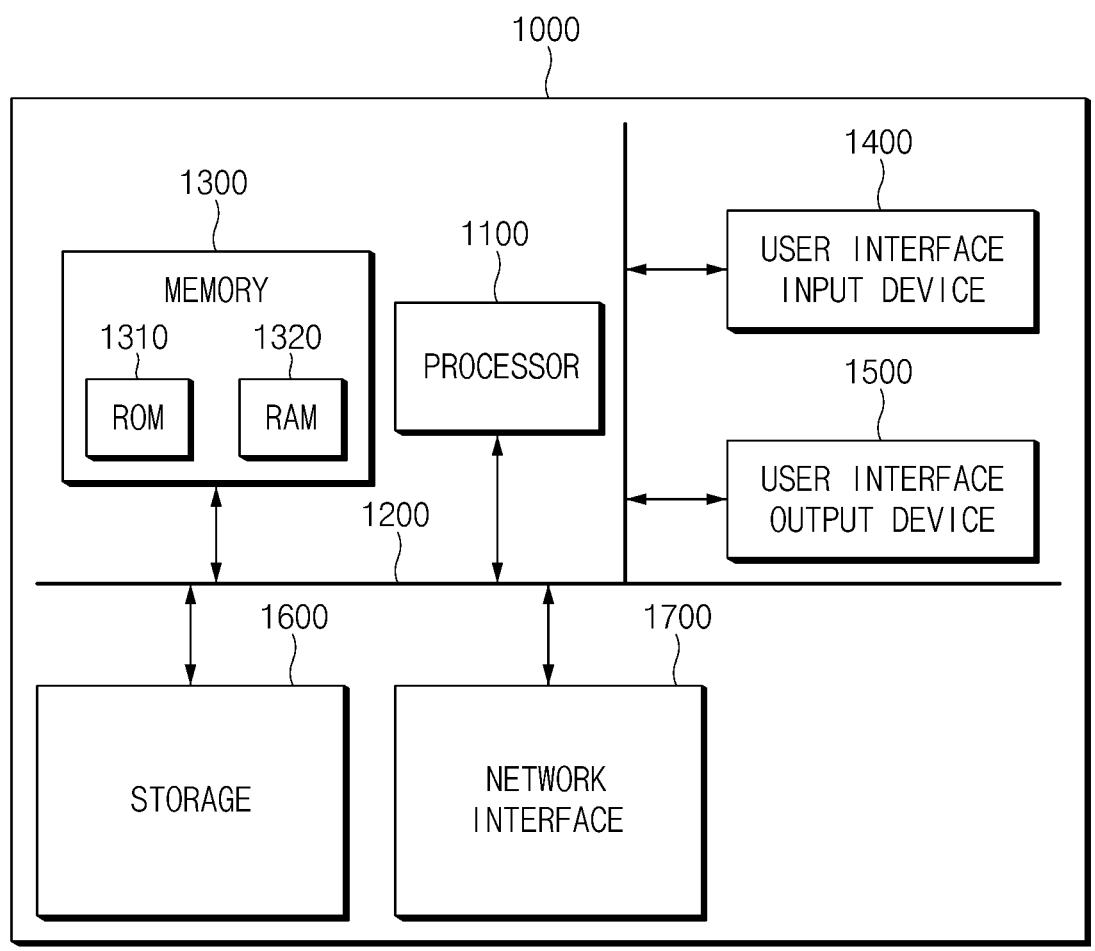
FIG. 7 illustrates a computing system.

FIG. 7 illustrates a computing system.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the example embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may simply measure a remaining amount of hydrogen in a storage vessel based on pressure and temperature.

Furthermore, the present technology may measure a remaining amount of hydrogen even without a flow meter using a temperature sensor and a pressure sensor, which are essential stabilization equipment capable of measuring over-pressure and an abnormal temperature. Thus, the present technology may reduce costs by removing an expensive flow meter with large volume.

Furthermore, the present technology may measure total remaining amounts and amounts of charging flow of a plurality of storage vessels based on the pressure and the temperature measured by means of one sensor module installed in the plurality of storage vessels connected in series and/or parallel with each other.

In addition, the present technology may measure a remaining amount of hydrogen in a storage vessel based on pressure and temperature even after power is cut off or even without constant power.

In addition, various effects ascertained directly or indirectly through the present disclosure may be provided.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the example embodiments of the present disclosure are provided to explain the spirit and scope of the present disclosure, but not to limit them, so that the spirit and scope of the present disclosure is not limited by the example embodiments. The scope of the present disclosure should be construed on the basis of the accompanying claims, and all the technical ideas within the scope equivalent to the claims should be included in the scope of the present disclosure.

What is claimed is:

1. A fuel storage system comprising:
   a storage vessel configured to accommodate fuel, wherein the fuel comprises a solid material and gaseous hydrogen;
   sensors configured to measure a first temperature in the storage vessel and a first internal pressure of the storage vessel;
   a controller configured to predict a first remaining amount of the fuel based on the first temperature and the first internal pressure and based on a relationship among different values of temperature, different values of equilibrium pressure, and different values of remaining amounts of the fuel as measured by the sensors at different times; and a display configured to display the predicted first remaining amount of the fuel,
wherein, according to the relationship, a remaining amount of the fuel is inversely proportional to temperature and is proportional to equilibrium pressure.

2. The fuel storage system of claim 1, wherein the sensors are disposed in piping connected in common with a plurality of storage vessels,
wherein the plurality of storage vessels are connected in series or in parallel with each other.

3. The fuel storage system of claim 1, wherein the sensors comprise:
a temperature sensor configured to measure a temperature of a coolant in the storage vessel; and
a pressure sensor configured to measure a pressure of the gaseous hydrogen in the storage vessel.

4. The fuel storage system of claim 1, wherein the controller is further configured to calculate a first equilibrium pressure in relation to the first internal pressure, the first temperature, and the first remaining amount of the fuel,
wherein, according to the relationship, the remaining amount of the fuel has an inverse correlation with temperature under a same equilibrium pressure condition, and
wherein, according to the relationship, the remaining amount of the fuel has a positive correlation with equilibrium pressure under a same temperature condition.

5. The fuel storage system of claim 1, wherein the controller comprises:
memory storing a plurality of tables that indicate the relationship; and
a processor connected with the memory.

6. The fuel storage system of claim 5, wherein the plurality of tables comprise:
a first table to be applied when the fuel is being used; and
a second table to be applied when the fuel is being charged.

7. The fuel storage system of claim 6, wherein the controller is configured to:
predict, based on a determination that the fuel is being used, the first remaining amount of the fuel based on the first table, and
predict, based on a determination that the fuel is being charged, the first remaining amount of the fuel based on the second table.

8. The fuel storage system of claim 6, wherein the second table indicates a second relationship in which a change in values of remaining amount of the fuel is affected by a change in values of equilibrium pressure to a lesser degree than the first table.

9. The fuel storage system of claim 6, wherein the controller is configured to predict the first remaining amount of the fuel based on an average value of measurement values during a specified duration based on the first table and based on a measurement value of at least one of equilibrium pressure or temperature changing at a rate greater than or equal to a threshold.

10. The fuel storage system of claim 6, wherein the controller is configured to predict the first remaining amount of the fuel, using the first table, based on a determination that an electronic device associated with the storage vessel has performed a cold start, and based on a measurement value of at least one of equilibrium pressure or temperature measured while the electronic device is stopped.

11. The fuel storage system of claim 1, wherein the display is configured to display the predicted first remaining amount of the fuel by displaying a screen representing the predicted first remaining amount of the fuel using lighting of a light emitting element or displaying a fuel gauge screen pointing to the predicted first remaining amount of the fuel using a pointer.

12. A fuel storage system comprising:
a storage vessel configured to accommodate fuel, wherein the fuel comprises a solid material and gaseous hydrogen;
a temperature sensor of the storage vessel;
a pressure sensor of the storage vessel;
a processor;
a memory storing at least one instruction, wherein the at least one instruction, executed by the processor, is configured to:
based on a temperature measured by the temperature sensor and an internal pressure measured by the pressure sensor and based on relationship data, predict a remaining amount of the fuel comprising at least a portion of the solid material and gaseous hydrogen, wherein, according to the relationship data, remaining amounts of fuel in the storage vessel and temperature have a negative correlation and remaining amounts of fuel and equilibrium pressure have a positive correlation; and
a display configured to display the predicted remaining amount of the fuel.

13. The fuel storage system of claim 3, further comprising:
a water gauge connected with the sensors,
wherein the water gauge comprises a float disposed in liquid in a water level pipe or at a side of the water level pipe, and
wherein at least one of the pressure sensor or the temperature sensor is connected with at least one of the liquid or the float.

14. The fuel storage system of claim 13, wherein the float is configured to indicate the first temperature measured by the temperature sensor and the first internal pressure measured by the pressure sensor, and
wherein the display is configured to display the predicted first remaining amount of the fuel by displaying the first remaining amount of the fuel based on the first temperature and the first internal pressure indicated on the float.

15. The fuel storage system of claim 13, wherein the float is configured to, based on the storage vessel being disposed under a first environmental condition, indicate, using a point on a graph to which a function of a first slope is applied, the first temperature measured by the temperature sensor,
wherein the float is configured to, based on the storage vessel being disposed under a second environmental condition, indicate, using a point on a graph to which a function of a second slope different from the first slope is applied, the first temperature measured by the temperature sensor, and
wherein the first environmental condition and the second environmental condition differ from each other in at least one of temperature, altitude, or ground gradient.

16. A method comprising:
measuring:
a first temperature in a storage vessel accommodating fuel, wherein the fuel comprises a solid material and gaseous hydrogen, and
a first internal pressure of the storage vessel;
predicting a first remaining amount of the fuel based on the first temperature and the first internal pressure and based on a relationship among different values of temperature, different values of equilibrium pressure, and different values of remaining amounts of the fuel measured at different times; and displaying the predicted first remaining amount of the fuel, wherein, according to the relationship, a remaining amount of the fuel is inversely proportional to temperature and is proportional to equilibrium pressure.

17. The method of claim 16, wherein the measuring comprises:

measuring the first temperature in the storage vessel and the first internal pressure of the storage vessel using a sensor disposed in piping connected in common with a plurality of storage vessels, wherein the plurality of storage vessels are connected in series or in parallel with each other.

18. The method of claim 16, wherein the predicting of the first remaining amount of the fuel comprises one of:

predicting the first remaining amount of the fuel based on a first table that indicates a first relationship, while the fuel is being used, among different values of equilibrium pressure, different values of temperature, and different values of remaining amounts of the fuel; or based on a determination that the fuel is being charged, predicting the first remaining amount of the fuel based on a second table that indicates a second relationship, while the fuel is being charged, among different values of equilibrium pressure, different values of temperature, and different values of remaining amount of the fuel, and wherein, in the second relationship, a change in values of remaining amount of the fuel is affected by a change in values of equilibrium pressure to a lesser degree than in the first relationship.

19. The method of claim 18, further comprising one of:

predicting the first remaining amount of the fuel according to an average value of measurement values during a specified duration based on the first table and based on a measurement value of at least one of equilibrium pressure or temperature changing at a first rate greater than or equal to a threshold; or predicting the first remaining amount of the fuel, using the first table, based on a determination that an electronic device associated with the storage vessel has performed a cold start, and based on a measurement value of at least one of equilibrium pressure or temperature measured while the electronic device is stopped.

20. The method of claim 16, further comprising:

indicating, using a float of a water gauge, the first temperature and the first internal pressure.

* * * * *